United States Patent [19]

Hanrot et al.

[11] Patent Number: 4,692,068

[45] Date of Patent: Sep. 8, 1987

[54] APPARATUS FOR DISTRIBUTION AT A REGULATED RATE OF A FLUIDIZABLE POWDERY MATERIAL

[75] Inventors: Jean-Pascal Hanrot, Aix-En-Provence; Jacky Volpeliere, Gardanne, both of France

[73] Assignee: Aluminium Pechiney, Gardanne, France

[21] Appl. No.: 817,121

[22] Filed: Jan. 8, 1986

[30] Foreign Application Priority Data

Jan. 8, 1985 [FR] France ................... 85 00469

[51] Int. Cl.⁴ .......................................... B65G 53/18
[52] U.S. Cl. ................................. 406/89; 406/123; 406/138; 406/155
[58] Field of Search ............... 406/89, 90, 123, 138, 406/155; 34/57 A; 204/67, 245

[56] References Cited

U.S. PATENT DOCUMENTS

| 2,919,955 | 1/1960 | Paton | 406/90 |
| 3,367,724 | 2/1968 | Emery et al. | 406/123 X |
| 4,279,549 | 7/1981 | Hanrot et al. | 406/90 X |

FOREIGN PATENT DOCUMENTS

| 1127799 | 4/1962 | Fed. Rep. of Germany | 406/89 |
| 2534891 | 4/1984 | France . | |
| 65984 | 5/1979 | Japan | 406/138 |

Primary Examiner—Jeffrey V. Nase
Attorney, Agent, or Firm—Oblon, Fisher, Spivak, McClelland & Maier

[57] ABSTRACT

An apparatus for the distribution at a regulated rate of a fluidizable powdery material has a storage container (1), a porous wall and air conduit for fluidizing the powdery material and an orifice for discharging the fluidized powdery material. A casing (2) has two parts, an upper part (2A) connected to the storage container and to the orifice, and a lower part (2B) which is separated from the upper part (2A) by the porous fluidization wall (4). The upper part (2A) of the casing is connected at one of its ends (7A), to the storage container (1) by a column (3), at an upper part of its opposite end, to a balancing and degassing column (6) and, in its lower part (7B), to the outlet orifice (8) for the fluidized powdery material, which is disposed immediately above the level of the porous fluidization wall (4). The lower part (2B) is connected to an intake (5) for fluidization gas at a regulated pressure.

2 Claims, 5 Drawing Figures

APPARATUS FOR DISTRIBUTION AT A REGULATED RATE OF A FLUIDIZABLE POWDERY MATERIAL

BACKGROUND OF THE INVENTION

1. Field of the Invention

The present invention concerns an apparatus for distribution at a regulated rate of a fluidizable powdery material.

It is known for powdery materials to be transported in the fluidized state from one storage location to another or from a storage location to one or more points of use of the material. It should be noted that the expression "fluidizable materials" as used herein denotes all materials which occur in a powdery form and in respect of which the granulometry and cohesion are such that the speed of flow of the injected air through the material produces, at a low speed, decohesion of the particles from each other and a reduction in the internal frictional forces, in such a way that the suspension so formed behaves very substantially like a homogenous fluid. Such materials are for example alumina which is intended for igneous electrolysis, cements and plasters, quick or slaked lime, fly ash, calcium fluoride, additive fillers for rubber and plastics material, starches, catalysts, powered carbon, sodium sulphate, phosphates, polyphosphates, pyrophosphates, metal powders, plastics materials in the form of powder, foodstuff products such as powdered milk, flour, etc.

2. Related Art

For a very long time now attention has been directed to means for controlling and even regulating the flow rate of a fluidized material (U.S. Pat. No. 2,667,448). Many mechanical constructions (such as valves and control flap arrangements) have been proposed, but they cannot be used when the material being transported is abrasive, which is the case with alumina which is intended for the production of aluminium; in that situation it is necessary to abandon using mechanical arrangements which are subject to wear, and to have recourse to the specific properties of powdery materials.

U.S. Pat. No. 2,919,159 describes a process for the pneumatic transportation of fluidized material, wherein the pneumatic conveyor conduit is fed with powder coming directly from the bottom of a column containing powder which is permanently fluidized with free air.

U.S. Pat. No. 3,964,793 describes a process for regulating the flow rate by weight of powdery materials in an installation for continuous pneumatic transportation by the injection of gas with a balancing effect by means of a fluidized feed column, wherein, for a given gas flow rate by weight, the pressure of the injected gas is measured and the amount of powdery materials introduced into the fluidized column is controlled, the head end of the column being at atmospheric pressure, in order to maintain the injected gas pressure at a given value.

U.S. Pat. No. 4,279,549 describes a process for the automatic regulation of the pneumatic conveyance of powdery material by use of a feed column, at the base of which is formed an embankment portion providing a feed of material by slippage thereof from the embankment portion, a dispatch chamber provided with a porous fluidization wall, conduits for fluidization and feed of gas at an increased pressure, provided with an injector, and conduits intended for transportation of the material. In that process, in order to cause a reduction in the angle of slope of the embankment portion, the material is fluidized and a reference pressure Pf below the porous wall is selected for a desired rate of flow of material into the dispatch duct. Above the porous wall, there is thus established a pressure $Pc = Pf$ in the dispatch chamber, in such a way that any increase in Pc beyond Pf gives rise to a corresponding reduction in the gaseous flow at the pressure Pf through the porous wall while any reduction in Pc below Pf gives rise to a corresponding increase in the gaseous flow.

That process has the advantage of providing for self-regulation of the flow rate of powdery material around the value selected in accordance with the pressure Pf, which eliminates any danger of choking of the dispatch column, and fixes the material flow rate.

At the present time, a certain number of users, in particular operators of Hall-Heroult electrolysis cells for producing aluminium, require such fluidized pneumatic transportation apparatuses to have a service life and a level of reliability which are further increased, together with a higher degree of precision in regard to regulating the material flow rate, both for the purpose of supplying electrolysis tanks and for the purpose of supplying apparatuses for dry-process trapping of fluorine-bearing effluents which are emitted by such tanks, by making use of the capability of adsorption of alumina with respect to fluorine-bearing substances. Finally, it is important that the levels of consumption of compressed air for fluidization and for fluidization and for fluidized conveyance should be minimized and that stoppage and restarting of the appartus occur in a simple, reliable and rapid manner. Such requirements also apply in regard to all types of fluidized conveying operations and not only in relation to alumina which is intended for electrolysis purposes.

SUMMARY OF THE INVENTION

The object of the present invention is to overcome the various disadvantages that are still to be found in the existing apparatuses, and to comply with the requirements of users in regard to reliability, accuracy and convenience of use.

The subject matter of the present invention is an apparatus for regulating the flow rate of a fluidizable powdery material including a means for storage and a means for fluidization of the powdery material and a means for discharge of the fluidized powdery material. The apparatus includes a casing having two parts: an upper part which is connected to the storage means and to the discharge means, and a lower part which is separated from the upper part by a porous fluidization wall. In accordance with the invention, the upper part of the casing is connected on the one hand to the storage means by a column which may extend into the casing to a greater or lesser degree and, on the other hand, at its opposite end, to a balancing and degassing column and finally, at the lower part of the outside face which is disposed on the same side as the balancing column, to an orifice for the outlet of the fluidized powdery material, which is disposed immediately above the level of the porous fluidization wall and which may be provided with a tubular connection to which a conduit for gravity discharge of the fluidized powdery material will be connected. The lower part of the casing has only an intake for fluidization air, at a regulated pressure. The invention makes it possible that the flow rate of fluidized alumina is controlled solely by acting on the pressure of the fluidization air and, for a given reference pressure, it is self-regulated.

Hereinafter, reference will be made to 'fluidization air' in order to simplify the description, but it will be appreciated that any other gaseous fluid may be suitable and that, for example, when fluidizing highly reactive substances or substances which run the risk of explosion (such as flours, or aluminum or magnesium powders), the gaseous fluid may be selected from inert or substantially unreactive gases such as argon, nitrogen, carbon dioxide, etc.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
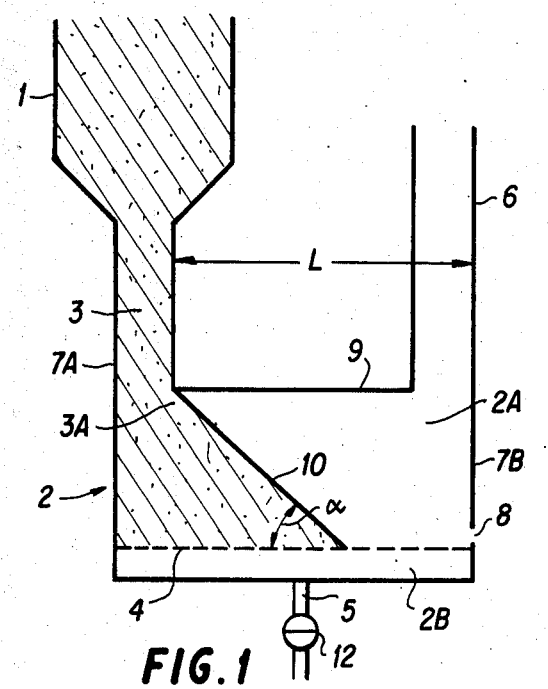
FIG. 1 shows a diagrammactic view in vertical section of the apparatus according to the invention.
Figure 1A:
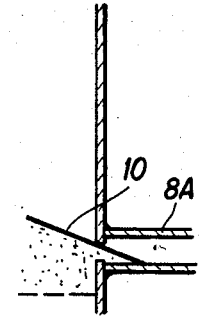
FIG. 1A is a view on an enlarged scale of an embodiment of the outlet orifice of FIG. 1 provided with a connection nozzle.
Figure 2:
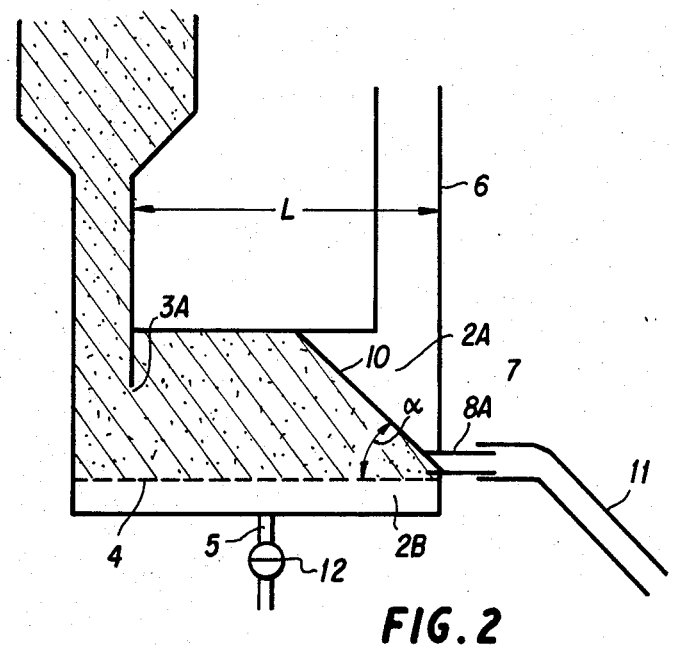
FIG. 2 shows a further embodiment in vertical section.
Figure 3:
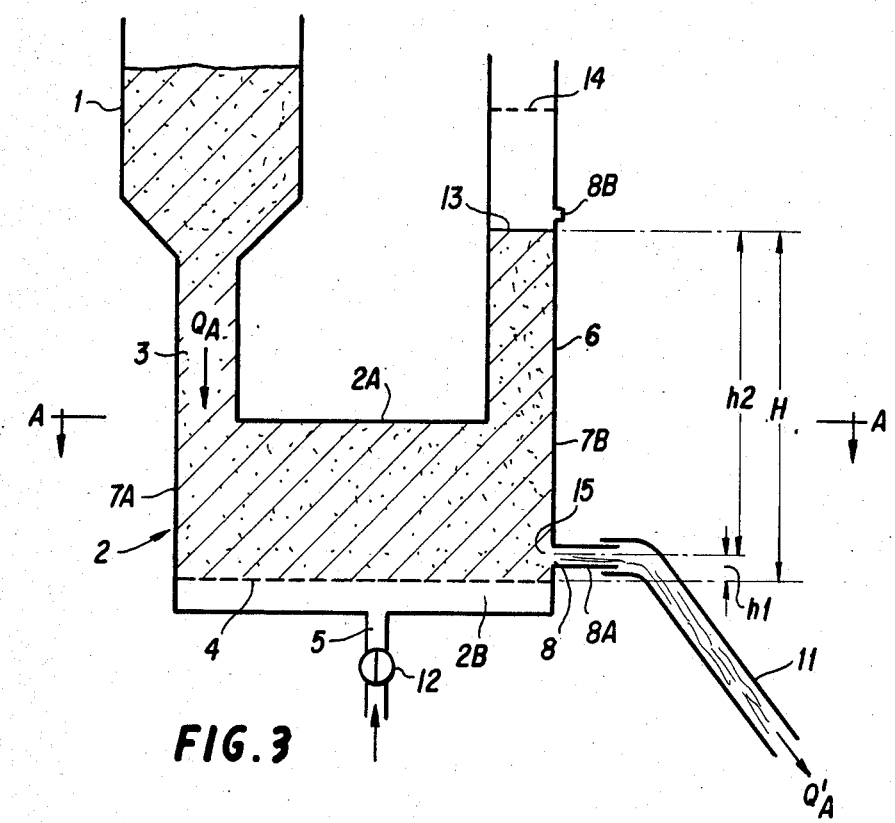
FIG. 3 shows, in vertical section, yet a further embodiment during operation.
Figure 4:
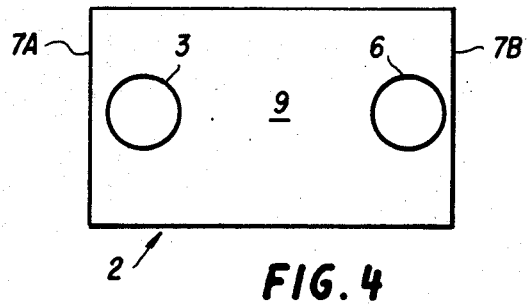
FIG. 4 is a view of the apparatus in horizontal section taken along line A—A of FIG. 3.

FIGS. 1, 1A and 2 correspond to the apparatus in the stopped condition while FIG. 3 shows the apparatus in the operating condition. The storage container 1 is connected to the casing 2 by a feed column 3.

The casing is generally of parallelepipedic shape, with its greatest dimension in the horizontal direction. In the lowest part 2B of the casing 2 are positioned a porous fluidization wall 4 and an intake 5 for fluidization air at a constant pressure. The intake 5 is controllable in known manner by control valve 12 to a predetermined reference value.

In the upper part 2A of the casing 2, at the side of one or its ends 7B, is a balancing and degassing column 6 and, at the side of the other end 7A, is the feed column 3. On the end 7B corresponding to the balancing column and substantially at the level of the porous wall 4, is an orifice 8 for the outlet of the fluidized powdery material. The orifice 8 is disposed immediately above the porous fluidization wall 4 and may be provided with a nozzle or connection 8A which in most cases is horizontal and tubular, and has an inside diameter greater than the diameter of the orifice 8, and to which a duct 11 for discharge of the powdery material may be connected. The lower end of the balancing column 6 is in alignment with the upper wall 9 of the casing.

In the rest condition, the powdery material which is stored in the container 1 goes down into the casing 2, forming a natural slippage embankment portion 10 (see FIG. 1) whose angle α relative to the fluidization grid depends on the nature and the physical state of the powdery material. The dimensions of the casing 2 must be such that for any powdery material the foot of the embankment portion 10 reaches no further than the level of the orifice 8; otherwise, there would be a continuous natural flow of the powdery material via 8A to the discharge duct 11, even in the absence of any fluidization. For that purpose, the distance L between the lower edge 3A of the column 3 and the opposite vertical end 7B of the casing is fixed upon construction of the apparatus in dependence on the powdery material to be used, the angle α of the embankment portion 10 of which can be measured. One may also or instead control the level to which the feed column 3 extends into the upper part of the casing 2, since the embankment portion 10 begins to form from the lower edge of the feed column. This may be done by use of a vertically adjustable lower edge 3A, as shown in FIG. 2.

As noted above, the orifice 8 may be provided with an outlet nozzle or connection 8A, the outside end of which may be connected to the pipe 11 for discharge of the fluidized powdery material. The connection 8A also forms a safety device in the stopped condition for the apparatus; since the connection 8A extends horizontally, accidental flow of the non-fluidized powdery material in the rest condition is blocked by the connection 8A (Figure 1A). It is thus possible to stop the system without the necessity for it to be completely emptied. Note that in FIG. 2 the connection 8A extends through the wall 7 to define the orifice 8.

The mode of operation of the apparatus may be described in the following manner:

With the casing 2 being filled with a powdery material (in the configuration shown in FIG. 1 or in FIG. 2) and the orifice 8 being closed, by means which are not shown, the fluidization air is introduced into the upper part 2A of the casing 2 by way of the conduit 5 and the control valve 12, and the porous wall 4. It is found that some of the powdery material first enters a "flowing" state as a result of initial decohesion of the grains due to the interposition of air within the material, and that it rapidly fills the upper part 2A of the casing and the bottom of the balancing column 6.

By further increasing the pressure of the air, it is found that the level of the powdery material gradually rises in the balancing column 6 to a certain height H (see FIG. 3) which depends on the pressure (Pf) of the fluidization air and the mean density (d) of the powdery material in the balancing column 6 (H=Pf/d).

In the casing proper, due to the fact that the air is trapped in the powdery material and cannot escape therefrom (except through the upper part of the column 6), the remainder of the powdery material is only in a pseudo-fluidized state or in a "potential fluidization" state, this being a described in our earlier French Patent FR-A-2 534 891, and which corresponds to a particular level of air pressure at the interstices of the particles of powdery material without there truly being decohesion and movement of the particles, as is the case in a truly fluidized medium, nor is there circulation of the air. Thus the embankment 10 remains, with the material thereof existing in the pseudofluidized state.

If now the orifice 8 is opened, expansion of the air may occur at the location of that orifice and in the region 15 which is disposed immediately upstream of the orifice 8, where a true fluidized state is produced, permitting fluid flow of the powdery material through the orifice 8 and the connection 8A.

The powdery material which flows out through the orifice 8 is replaced by successive slippages, in a cascade, from the embankment portion 10, of the material in a state of potential fluidization, this phenomenon progressively moving towards the foot of the feed column 3. Each such "material slippage" frees a sufficient space for the powdery material to pass locally from the potential fluidization state to the true fluidization state, which, for a wide range of flow rates, provides a supply of alumina which is equal to the discharge flow rate, without any abrupt changes in the flow rate.

The dynamic balance of the other elements of the system occurs in the following fashion:

The fluidization pressure Pf is balanced by the counterpressure $P_2$ of the balancing column 6, plus the pressure drops $P_1$ through the porous fluidization wall so that:

$$Pf = P_2 + P_1$$

The pressure $P_2$ is itself equal to $(h_1 + h_2)d_1$, where $d_1$ is the mean specific gravity of the partially fluidized phase (being equal for example to about 0.75 to 0.95 for "sandy coarse" alumina for electrolysis purposes), $h_1$ being the height between the fluidization wall 4 and the axis of the orifice 8, and $h_2$ being the height between the axis of the orifice 8 and the upper part 14 of the column of fluidized powdery material.

Assuming that the pressure $P_e$ which exists above the balancing and degassing column 6 is different from atmospheric pressure, a condition of balance is established for an effective height H' of column 6 as $H' = H - Pe/d$, Pe being expressed in relation to atmospheric pressure which is taken as a reference pressure=0.

The fluidization air flow rate Qf is equal to the following:

$$Qf = Q1 + Q2 + Qp$$

Q1 being the flow rate of air entrained by way of the outlet orifice 8 with the fluidized phase, corresponding to the relief of pressure in respect of the powdery material in the potential fluidization state, Q2 being the degassing air flow rate in the balancing column, and Qp being the (low) flow rate due to various other losses, which should be negligible in a properly designed apparatus.

The flow rate of powdery material $Q'_A$, at the outlet of the orifice 8, is equal to the flow rate $Q_A$ of alumina coming from the storage container 2, if it is accepted that the losses due to material flying away in the balancing column 6 are nil, which should be the case.

The system thus is in a condition of equilibrium, and that is an essential element of the invention; it is found that, for a given powdery material and for a given size for orifice 8, the powdery material flow rate $Q'_A$ is in a biunivocal relationship with Pf, that relationship being substantially linear within certain limits which will be specified hereinafter.

The result of that is that the flow rate of powdery material of such an apparatus may be fixed and regulated by acting solely on the pressure of the fluidization air, without another source of air being necessary, as was the case in prior processes (and in particular in U.S. Pat. No. 4,279,549), which necessitated an intake of fluidization air and a separate intake of air for pneumatic conveying purposes.

The diameter of the orifice 8 determines both the flow rate $Q'_A$ of alumina for a given pressure Pf and the form of the curve representing the function $Q'_A = f(Pf)$.

Insofar as a fluidized powder such as alumina may be compared to a true fluid, there is here a certain correlation with the law which gives the flow rate Q by volume of a fluid through an orifice in a vertical wall:

$$Q = K \times S \times \sqrt{2gh} \, .$$

Q being the fluid flow rate (in $m^3/s$),
S being the area of the orifice (in $m^2$),
g being the acceleration due to gravity in $m/s^2$,
h being the head of the orifice as measured from the upstream level of the fluid to the center of the orifice (in meters), and
K being a coefficient which depends in particular on the geometry of the outlet orifice; the value of K may vary from about 0.6 to 1.

If curves of the flow rate by weight of alumina in dependence on the fluidization pressure are plotted, taking the section of the orifice 8 as a parameter, it is found that for certain values of the parameter "diameter of the orifice", such curves have a substantially straight portion. Therefore, it is possible to optimize the diameter of the orifice 8 in such a way that the flow rate by weight substantially corresponds to the middle of the straight part of the curves. If the pressure Pf remains properly constant, the flow rate by weight of the powdery material remains remarkably constant.

If there is a wish to provide very quickly and momentarily for a very great increase in flow rate (for example, for the introduction of a massive amount of alumina into an electrolysis tank which is threatening to run away), it is possible to provide an additional orifice 8B which is disposed in the upper part of the balancing column and above the normal level H of the column of powdery material. An increase in Pf will then have a double effect: a normal increase in the outlet flow rate through the orifice 8 and the creation of an additional flow due to fluidized alumina overflowing and issuing from the orifice 8B, because the column 6 now reaches a level as indicated at 14.

It would also be possible to provide the additional orifice 8B below the normal level H; this would then provide a constant make-up flow which would be less than the flow through the main orifice 8; in certain circumstances, that could be desirable.

EXAMPLE OF USE

A fluidized alumina metering distributor was built to trap fluorine-bearing effluents emitted by a series of tanks for the production of aluminium by means of igneous electrolysis. The gases emitted by the tanks were sucked into and collected in a general collector into which alumina picked up the fluorine-bearing derivatives and the alumina was then re-injected into the electrolysis tanks.

The outlet connection 8A was connected by a transparent tube 11 of polymethylmethacrylate, which was inclined at about 45° downwardly, to the base of the collector for collecting the gas from the tanks. The feed column 3 was tapped off the circuit which supplied the alumina to the usual equipment for feeding the electrolysis tanks (for example an air cushion support conveyor). The balancing column 6 opened in the upper part of the tank gas collector. As that collector, which was subjected to a suction effect, was at an internal reduced pressure, the pressure Pe which obtained above the balancing column 6 was lower than atmospheric pressure (about −100 mmWG).

The diameter of the connection 8A was 20 mm, which corresponds to the optimum value for a mean flow rate by weight of alumina: $Q_A = 1.8$ metric tons/hour.

For the nominal flow rate, the fluidization pressure Pf was regulated at 400 mm water gauge ($\approx$3920 Pa). The total area of the porous fluidization wall was 4.5 dm$^2$, which corresponded to a total air flow rate Qf of 11 liters per minute.

The pressure drop $P_1$ through the porous fluidization wall being 20 mm BC, $P_2$ (counterpressure of the balancing column) was equal to 400−20 (i.e., 380) mm WG (=3720 Pa).

The above-described system for a regulated feed of fluidized alumina was used for several months to feed apparatuses for the trapping of fluorine-bearing effluents from a series of 120 electrolysis tanks, and it operated with perfect regularity. Its rate of consumption of fluidization air was less than 1 m$^3$/hour and per m$^2$ of porous fluidization wall, at a Pf of 500 mm of WG (4900 Pa).

By means of a simple adjustment to the fluidization pressure Pf and the size of the outlet orifice 8, it can be applied to all types of powdery materials set forth at the beginning of this specification.

Obviously, numerous modifications and variation of the present invention are possible in light of the above teachings. It is therefore to be understood that within the scope of the appended claims, the invention may be practiced otherwise than as specifically described herein.

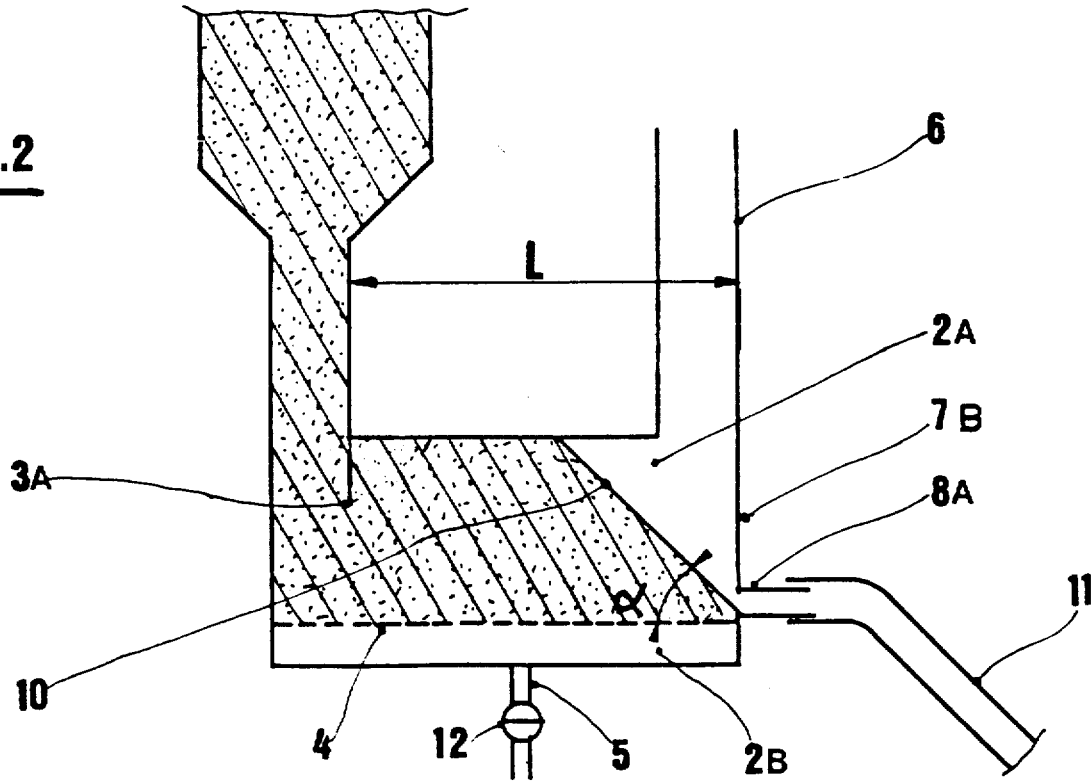

What is claimed as new and desired to be secured by Letters Patent of the United States:

1. An apparatus for the distribution at a regulated rate of a fluidizable powdery material, comprising:
   a casing divided into upper and lower parts by a porous fluidization wall and having a vertical face;
   material storage means connected to one end of said upper part of said casing opposite said vertical face by a feed column;
   a balancing and degassing column connected to another end of said upper part of said casing adjacent said vertical face;
   means for regulating a distribution rate of said powdery material from said casing, said means for regulating comprising an outlet orifice connected to said vertical face at a vertical position immediately above said porous fluidization wall and having a controlled sectional area smaller than that of said vertical face;
   means for introducing fluidization gas at a regulated pressure into said lower part of said casing; and
   an outlet nozzle connected to said outlet orifice and having a horizontal bottom surface extending from the orifice, said nozzle having a diameter greater than that of said orifice, wherein said feed column is connected to an upper wall of said casing at a lower edge of said feed column, and wherein a distance L between said lower edge and said vertical face is such that unfluidized material delivered from said feed column to said casing reaches no further than said orifice.

2. An apparatus for the distribution at a regulated rate of a fluidizable powdery material, comprising:
   a casing divided into upper and lower parts by a porous fluidization wall;
   material storage means connected to one end of said upper part of said casing by a feed column;
   a balancing and degassing column connected to another end of said upper part of said casing;
   an outlet orifice connected to said another end of said upper part of said casing at a vertical position immediately above said porous fluidization wall;
   means for introducing fluidization gas at a regulated pressure into said lower part of said casing;
   a second outlet orifice disposed in a sidewall of said balancing column above the level of said first outlet orifice, for providing a make-up flow rate,
   wherein said second outlet orifice is disposed above a level reached by said powdery material in said balancing column upon introduction of said fluidization gas into said lower part during normal operation and below the top of said balancing column.

* * * * *

UNITED STATES PATENT AND TRADEMARK OFFICE
CERTIFICATE OF CORRECTION

PATENT NO. : 4,692,068            Page 1 of 3

DATED : Sep. 8, 1987

INVENTOR(S) : Jean-Pascal Hanrot et al.

It is certified that error appears in the above-identified patent and that said Letters Patent is hereby corrected as shown below:

The Title Page should be deleted to appear as per attached Title Page.

Figure 2 of the Drawings should be deleted to appear as per attached Figure 2.

Signed and Sealed this

Twenty-sixth Day of April, 1988

Attest:

DONALD J. QUIGG

*Attesting Officer*        *Commissioner of Patents and Trademarks*

United States Patent [19]

Hanrot et al.

[11] Patent Number: 4,692,068
[45] Date of Patent: Sep. 8, 1987

[54] APPARATUS FOR DISTRIBUTION AT A REGULATED RATE OF A FLUIDIZABLE POWDERY MATERIAL

[75] Inventors: Jean-Pascal Hanrot, Aix-En-Provence; Jacky Volpeliere, Gardanne, both of France

[73] Assignee: Aluminium Pechiney, Gardanne, France

[21] Appl. No.: 817,121

[22] Filed: Jan. 8, 1986

[30] Foreign Application Priority Data

Jan. 8, 1985 [FR] France ............... 85 00469

[51] Int. Cl.$^4$ ............................................. B65G 53/18
[52] U.S. Cl. .................................... 406/89; 406/123; 406/138; 406/155
[58] Field of Search ................. 406/89, 90, 123, 138, 406/155; 34/57 A; 204/67, 245

[56] References Cited

U.S. PATENT DOCUMENTS

| 2,919,955 | 1/1960 | Paton ........................... 406/90 |
| 3,367,724 | 2/1968 | Emery et al. ............... 406/123 X |
| 4,279,549 | 7/1981 | Hanrot et al. ................ 406/90 X |

FOREIGN PATENT DOCUMENTS

| 1127799 | 4/1962 | Fed. Rep. of Germany ........ 406/89 |
| 2534891 | 4/1984 | France |
| 65984 | 5/1979 | Japan .................................. 406/138 |

Primary Examiner—Jeffrey V. Nase
Attorney, Agent, or Firm—Oblon, Fisher, Spivak, McClelland & Maier

[57] ABSTRACT

An apparatus for the distribution at a regulated rate of a fluidizable powdery material has a storage container (1), a porous wall and air conduit for fluidizing the powdery material and an orifice for discharging the fluidized powdery material. A casing (2) has two parts, an upper part (2A) connected to the storage container and to the orifice, and a lower part (2B) which is separated from the upper part (2A) by the porous fluidization wall (4). The upper part (2A) of the casing is connected at one of its ends (7A), to the storage container (1) by a column (3), at an upper part of its opposite end, to a balancing and degassing column (6) and, in its lower part (7B), to the outlet orifice (8) for the fluidized powdery material, which is disposed immediately above the level of the porous fluidization wall (4). The lower part (2B) is connected to an intake (5) for fluidization gas at a regulated pressure.

2 Claims, 5 Drawing Figures

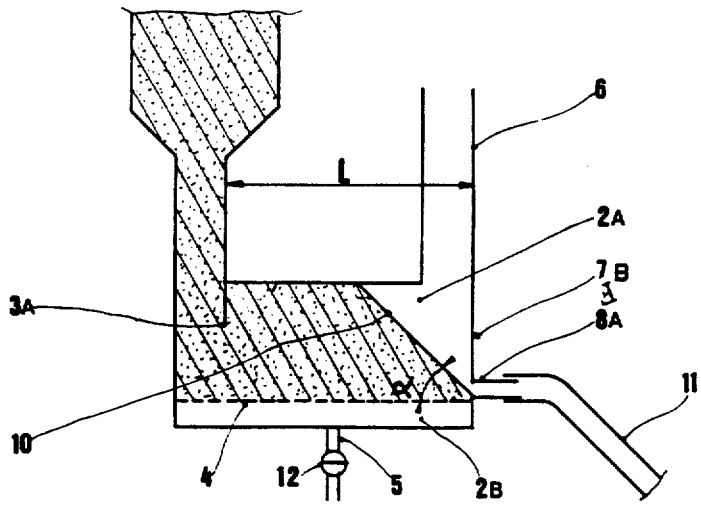

UNITED STATES PATENT AND TRADEMARK OFFICE
CERTIFICATE OF CORRECTION

PATENT NO. : 4,692,068

DATED : September 8, 1987

INVENTOR(S) : Jean-Pascal HANROT, et al

It is certified that error appears in the above-identified patent and that said Letters Patent is hereby corrected as shown below: